United States Patent
Nicolas et al.

(10) Patent No.: US 7,814,031 B2
(45) Date of Patent: Oct. 12, 2010

(54) APPARATUS FOR HANDLING MAIL ON THE FLY

(75) Inventors: Christian Nicolas, Chatuzange le Goubet (FR); Didier Painault, Bagnolet (FR)

(73) Assignee: NEOPOST Technologies, Bagneux (FR)

( * ) Notice: Subject to any disclaimer, the term of this patent is extended or adjusted under 35 U.S.C. 154(b) by 1484 days.

(21) Appl. No.: 11/046,050

(22) Filed: Jan. 28, 2005

(65) Prior Publication Data

US 2005/0171921 A1   Aug. 4, 2005

(30) Foreign Application Priority Data

Jan. 30, 2004   (FR) ................................. 04 00920

(51) Int. Cl.
| | |
|---|---|
| G06F 17/00 | (2006.01) |
| G06G 7/00 | (2006.01) |
| B65B 35/00 | (2006.01) |
| B65B 57/10 | (2006.01) |
| B65B 57/20 | (2006.01) |
| B65G 43/00 | (2006.01) |
| B07C 5/00 | (2006.01) |

(52) U.S. Cl. .................. 705/400; 705/406; 53/498; 209/523; 198/341.03

(58) Field of Classification Search .............. 705/408, 705/401; 177/25, 4
See application file for complete search history.

(56) References Cited

U.S. PATENT DOCUMENTS

| | | | | |
|---|---|---|---|---|
| 5,014,797 | A * | 5/1991 | Dolan et al. | 177/4 |
| 5,300,736 | A * | 4/1994 | Ehrhardt | 177/145 |
| 6,456,987 | B1 * | 9/2002 | Pauschinger | 705/408 |
| 2002/0060097 | A1 * | 5/2002 | Thiel | 177/25.15 |
| 2003/0055790 | A1 | 3/2003 | Dolan et al. | 705/60 |
| 2003/0106932 | A1 * | 6/2003 | Malatesta et al. | 235/375 |
| 2003/0168798 | A1 * | 9/2003 | Tufekci et al. | 271/258.01 |
| 2004/0055790 | A1 * | 3/2004 | Gerstenberg et al. | 177/1 |

FOREIGN PATENT DOCUMENTS

EP   0 854 445   A2   12/1997

OTHER PUBLICATIONS

Mancini, Leticia, "Weighing Systems: Right on the Money"; Chilton's Food Engineering; V69N6 pp. 99 Jun. 1997 from Dialog.*

* cited by examiner

*Primary Examiner*—John W Hayes
*Assistant Examiner*—David J Clark
(74) *Attorney, Agent, or Firm*—Sughrue Mion, PLLC

(57) ABSTRACT

This mail-handling apparatus includes a feed module for feeding in mail items, a weigh module and a franking module. The weigh module includes regulator means for regulating the speed of advance of the conveyor means of the weigh module, which regulator means are adapted to take account of the weighing times taken to weigh the mail items.

8 Claims, 3 Drawing Sheets

APPARATUS FOR HANDLING MAIL ON THE FLY

CROSS-REFERENCE TO RELATED APPLICATIONS

This applications claims priority from French Patent Application No. 04 00920 filed Jan. 30, 2004.

The present invention relates to the field of mail handling.

It relates more precisely to mail-handling apparatus that is particularly suited to franking items on the fly and to high throughputs of mail fed in in arbitrarily mixed batches.

BACKGROUND OF THE INVENTION

Mail handling apparatus conventionally includes a franking module organized to print postage stamps and other information (slogans, etc.) on the mail.

In known manner, the information printed during franking includes an enciphered code required by international standards, which enciphered code is computed on the basis of determined parameters (date, postal or "ZIP" code, etc.).

In franking modules that use printing systems that use ink jet technology, it is important for the speed of advance of the mail item, as it goes past the print head, to be substantially constant, even if such a constant speed can be set differently as a function of the mail to be handled.

Document US 2003/0055790 (PITNEY BOWES) describes a mail-handling system including franking means that use ink printing technology and in which generating the enciphered code requires a time lying in the range 200 milliseconds (ms) to 500 ms.

That device therefore has mail drive means adapted to cause the mail to advance at a constant speed at the time at which it is substantially under the print head.

In the PITNEY BOWES arrangement, the mail conveyor module must be slowed down in order to guarantee that it allows the time necessary for computing the above-mentioned enciphered code (that computation must take place before the mail item reaches the print head), and then accelerated so as to impart to the mail items the pre-required constant speed at the time at which franking takes place.

Thus, the PITNEY BOWES mail handling apparatus makes it necessary to brake and to accelerate the advance of the belt, or even to stop it.

Therefore, it does not make it possible to handle mail on the fly.

Also, the PITNEY BOWES mail handling system does not describe taking account of mail item weight, which is required for enciphering the code; it assumes that all of the mail items are of the same weight.

Therefore, such a system cannot handle mail in arbitrarily mixed batches.

OBJECTS AND SUMMARY OF THE INVENTION

An object of the invention is to solve the above-mentioned problems, i.e. to provide a system that can handle mail in arbitrarily mixed batches and on the fly.

To this end, the invention relates to mail-handling apparatus, in particular adapted to handling mail in arbitrarily mixed batches and/or on the fly, said apparatus comprising:

a feed module for feeding in mail items to be franked;

detector means for detecting at least one dimension of said mail item;

evaluator means for evaluating a weighing time taken to weigh said mail item as a function of said at least one dimension; and regulator means adapted to take account of said weighing time in order to regulate the speed of advance of conveyor means of a weigh module, said conveyor means being adapted to drive said mail item towards a franking module;

said weigh module further including:
  selector means adapted to obtain one mail item at a time, from said feed module;
  a weigh tray for weighing said mail item; and
  computer means for computing an enciphered code representing, in particular, the weight of said mail item; and said franking module including print means adapted to print said enciphered code onto said mail item, and second conveyor means for conveying said mail item that are independent of the conveyor means of said weigh module.

In accordance with the invention, the variation in the speed of the conveyor means of the weigh module has no effect on the speed of the second conveyor means of the franking module.

Very advantageously, this control of the speed of the conveyor means of the weigh module as a function of the dimensions of the mail item makes it possible to guarantee that advance of the mail items on the conveyor means is optimized while also guaranteeing accurate weighing.

The invention thus makes it possible to manage high throughputs of about 10,000 envelopes per hour.

In a preferred embodiment, the regulator means further take account of the computing time taken for computing said enciphered code for regulating said speed of the conveyor means of the weigh module, and guarantee that the transfer of said mail item to the franking module effected by said weigh module takes place after said computation.

The invention thus makes it possible to take account of the incompressible time taken for computing the enciphered code, thereby making it possible to avoid jams in the weigh and the print modules, in particular when handling mail in arbitrarily mixed batches and on the fly.

Preferably, the selector means are adapted to guarantee that a predetermined distance is maintained between the leading edges of two consecutive mail items on the conveyor means of the weigh module, said distance being, in a preferred embodiment, equal to the length of the weigh module.

Thus, it is possible, by knowing the speed of advance of the belt for the preceding mail item, to determine the time from which the mail item being weighed will be alone on the belt.

By means of this preferred characteristic, the mail item is on its own on the weigh tray when it is weighed.

In a preferred embodiment, the conveyor means of the weigh module are adapted to cause said item to slide against a wall of said weigh module before it is transferred to said franking module.

This characteristic advantageously makes it possible to jog the mail items into alignment so that they come under the print head in a known predetermined position even when the mail items are handled in arbitrarily mixed batches, i.e. when the mail items to be franked are of different formats.

In a preferred embodiment of this variant, as seen from the mail item, the vertical wall presents a back-slope that tends to maintain said mail item flat on the conveyor means.

This back-slope thus makes it possible to prevent letters and other parcels from slipping upwards as they are sliding along the above-mentioned wall.

In another preferred embodiment, at least on said weigh tray, and on either side of its conveyor means, said weigh module has two edges that are raised slightly relative to the surface of said conveyor means.

These raised edges or rims advantageously make it possible to reduce the area of contact between a mail item and the weigh tray, thereby preventing mail items that are thick or of large dimensions from pivoting.

BRIEF DESCRIPTION OF THE DRAWINGS

Other characteristics and advantages of the present invention appear more clearly from the following description given by way of non-limiting indication and with reference to the accompanying drawings, in which.

MORE DETAILED DESCRIPTION

Figure 1:
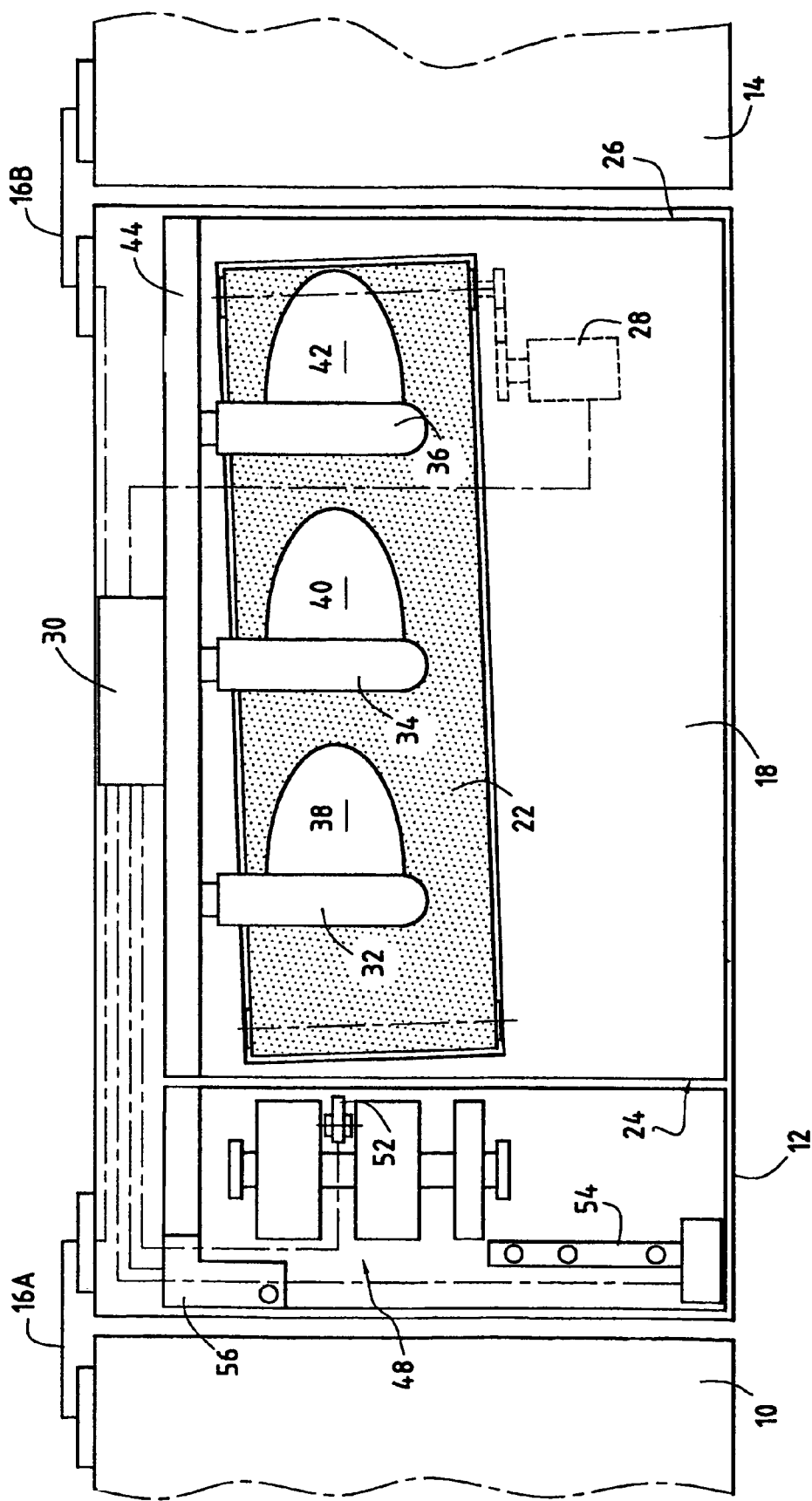
FIG. 1 is a plan view of mail-handling apparatus of the invention, in a preferred embodiment.
Figure 2:
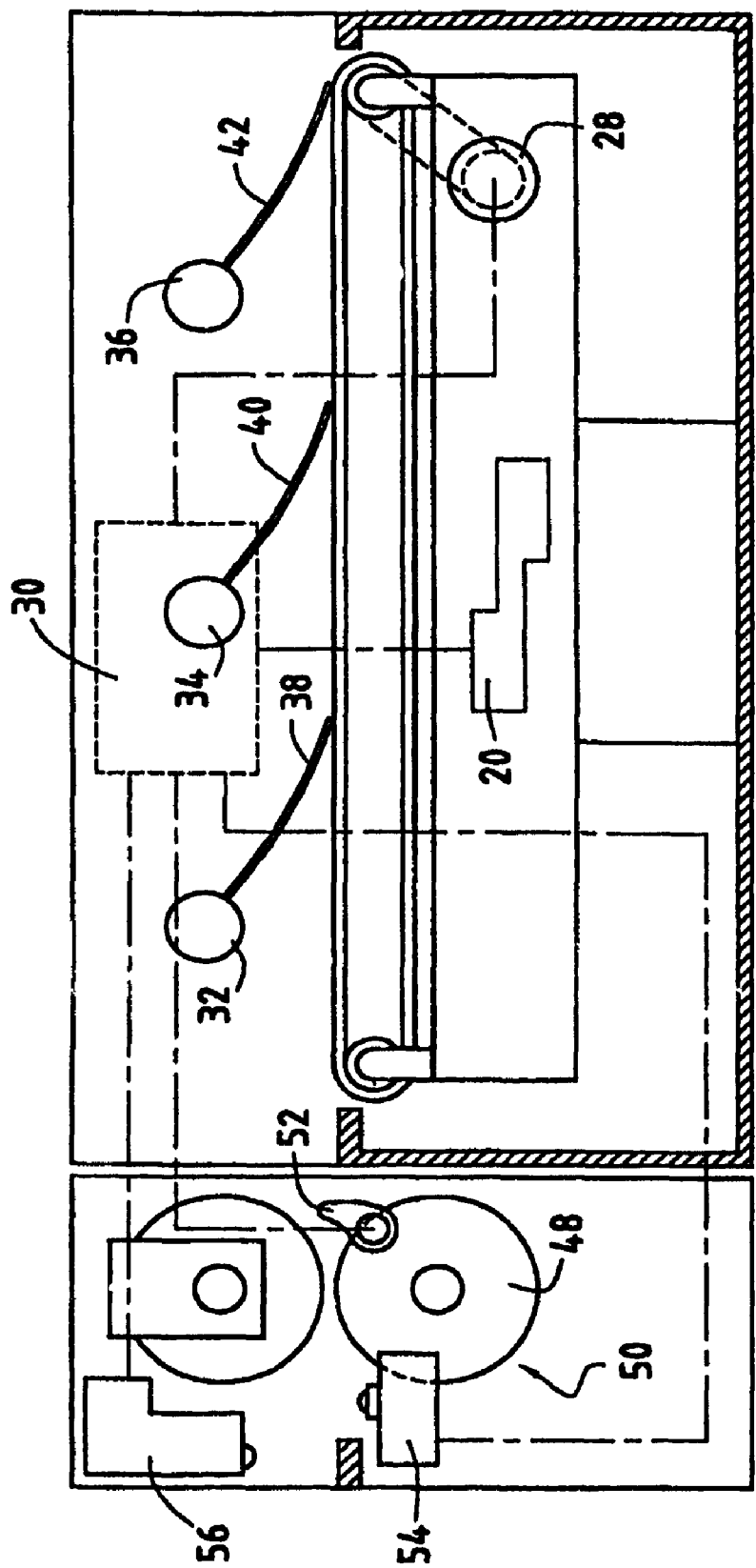
FIG. 2 is a longitudinal section view of the apparatus of FIG. 1.

FIGS. 1 and 2 show mail-handling apparatus of the invention in a preferred embodiment.

Disposed from upstream to downstream relative to the direction in which the mail items advance, the mail-handling handling apparatus 1 comprises a mail item feed module 10, a weigh module 12, and a franking module 14. Each of these elements is connected to the preceding element via a computer link 16A, 16B.

The weigh module 12 includes selector means adapted to obtain one mail item at a time from the feed module 10.

In the embodiment described herein, the selector means are constituted by a set of conveyor rollers 48 disposed at the inlet of the module at an upstream transverse face 24 and serving to extract the mail items ejected by the feed module 10. Depending on the configuration of the mail-handling machine, the rollers can sometimes be present directly at the outlet of the feed module.

This mail-handling apparatus can frank mail items of various formats, from American format No. 5 (76.2 mm×127 mm) to European format b4 (250 mm×353 mm), including European format C6/5 (114 mm×229 mm), and up to a determined thickness, e.g. 16 mm, corresponding to the height of the insertion slot through which the mail items are inserted into the feeder.

The weigh module 12 includes a weigh tray 18 with its weigh unit 20 and conveyor means 22 adapted to convey the mail items from one edge of said tray to the other.

In the embodiment described herein, the conveyor means 22 are constituted by a single conveyor belt or strip 22 which conveys mail items extracted by the selector module from a position upstream from the tray, at the upstream transverse face 24 of said tray, to a position downstream from said tray, at a downstream face 26 of said tray. The belt conveyor means are actuated by a drive motor 28 which is advantageously of the electric type and which is actuated from processor means 30 which advantageously include a microprocessor and which also manage the information passing through the computer links.

Optional holding apparatus for holding the mail items and designed to press said mail items against the weigh tray while they are being conveyed is made up, for example, of three presser elements disposed one behind another in the direction in which the mail items are conveyed, and each being formed of a holding arm 32, 34, 36 at the bottom end of which a flap 38, 40, 42 or any other analogous flexible presser means (brush, wheel, roller) whose length is relative long for exerting a sufficient pressure force on the mail item. Said presser elements are mounted perpendicularly to a longitudinal vertical wall 44 serving as a reference surface for the mail items.

In the preferred embodiment described herein, the conveyor means constituted by the motor-driven conveyor belt 22 are adapted to cause the mail items to slide along said longitudinal wall 44 before they are transferred to the franking module 14.

To this end, the motor-driven conveyor belt 22 presents a width not less than the width of the flap or of the resilient presser means, in order to optimize guiding the mail items and jogging them into alignment against the reference surface, which guiding and jogging are advantageously facilitated by the belt sloping towards the longitudinal reference wall at a determined angle relative to direction in which the mail items are conveyed. The value of this angle depends in particular on the length of the weigh module. For a weigh module that has a weigh tray that is 60 centimeters (cm) long and over which three presser elements are mounted, each equipped with a flap that is 8 cm in width, said angle is about 2.5°.

In the invention, at its inlet, the weigh module is provided with format-detecting detector means 50 adapted to detect at least one dimension of a mail item.

The detector means 50 are connected to the processor means 30 are they make it possible, in the preferred embodiment descried herein, to deliver data relating to the thickness, the length, and the width of said mail item.

Said detector means 50 are also referred to as "format detector means".

Said format detector means comprise a masking flag 52 for measuring the lengths of the mail items, which flag is advantageously disposed between the drive rollers and is actuated by the leading and the trailing edges of the mail items, an optical sensor 54 for measuring the widths of the mail items, and a Hall-effect detector 56 for measuring the thicknesses of said mail items.

It is important to note that although in the example shown, said format detector means are disposed in the weigh module, this is in no way an obligation, and that, because of the computer link 16A existing with the feed module 10, it is quite possible to consider making provision for the corresponding data to be delivered directly by said feed module when said module is provided with such format detector means by construction.

In accordance with the invention, the mail-handling apparatus of the invention includes means for evaluating the time required to weigh the mail item as a function of its format.

In the embodiment described herein, this weighing time TP1 is obtained by the processor means 30 from the table TB given below.

TABLE TB

| F1 | TP1 |
| F2 | TP2 |
| F3 | TP3 |

This table TB thus comprises two columns and a certain number of rows, each row associating a weight time $TP_i$ with a mail item format $F_i$.

Thus, in this embodiment, when the processor means 30 determine that the format of a mail item is the format F2, they take said format F2 into account for setting the time TP2 for said mail item.

Figure 3:
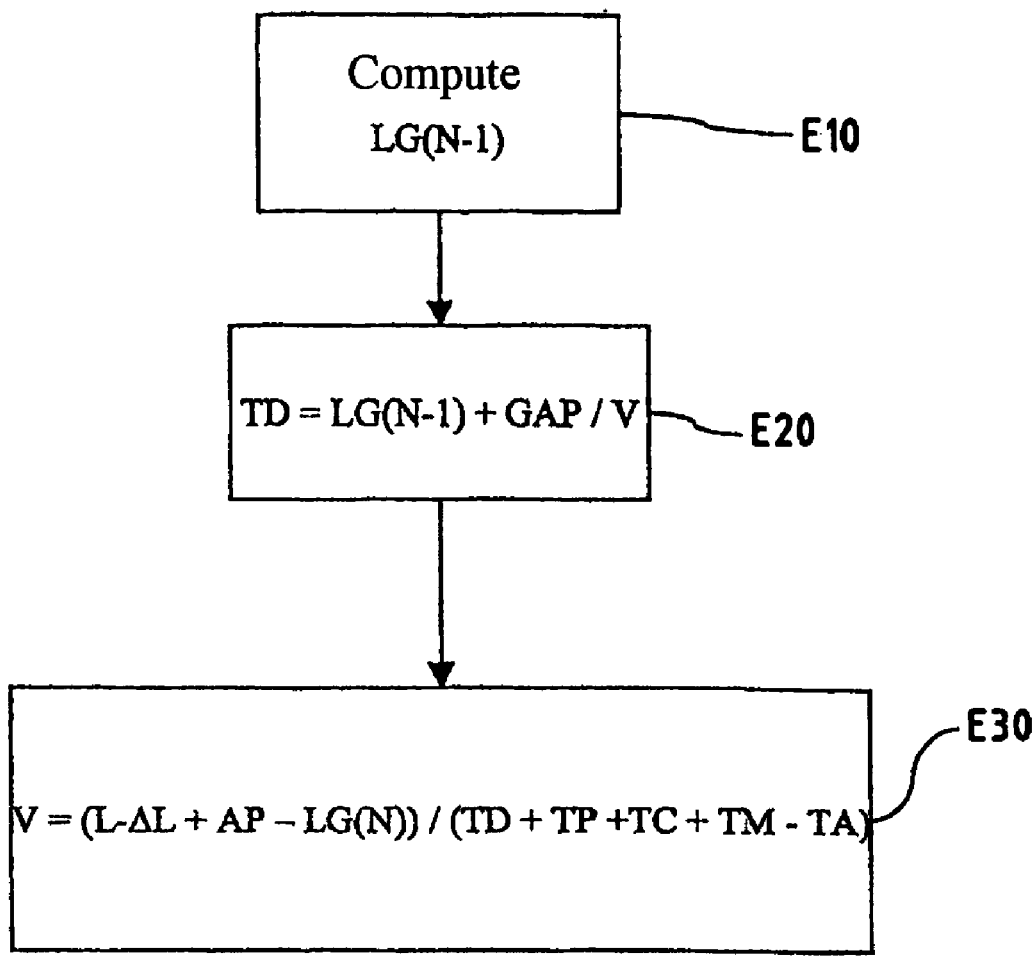
FIG. 3 is a flow chart showing the main steps in measuring the speed of the conveyor means of the weigh module in a preferred embodiment of the invention.

With reference to FIG. 3, a description is given below of the main steps E10 to E30 for determining the speed of the conveyor means of the weigh module in a preferred embodiment of the invention, for conveying a current envelope N.

During a first step E10, the length LG(N−1) of the preceding envelope on the conveyor belt 22 is determined.

This measurement is performed, as described above, by the detector means 50.

During the next step E20, the processor means 30 measure a triggering waiting time TD before the item is weighed.

In the preferred embodiment described herein, the triggering time TD is given by the following formula:

$$TD=LG(N-1)+GAP/V$$

where:

LG(N−1) is the length of the preceding envelope on the conveyor belt 22;

GAP is a constant distance determined between two leading edges of two consecutive mail items on the transport means; and V is the current speed of the belt, i.e. the speed 5 of advance of the conveyor means for the preceding envelope N−1.

After having determined the triggering time TD, the processor means act, during a step E30 to measure the speed of advance of the conveyor means for conveying the envelope N.

In the embodiment described herein, said speed V is given by the following formula:

$$V=(L-\Delta L+AP-LG(N))/(TD+TP+TC+TM-TA)$$

where:

L is the length over which the conveyor belt 22 advances;

ΔL is a constant distance corresponding to a safety margin that is allowed for guaranteeing that the mail item is properly positioned on the conveyor belt 22;

AP is the distance between the weigh tray 18 and the inlet of the second conveyor means of the franking module 14;

LG(N) is the length of the envelope N, measured by the detector means 50 as described above;

TD is the triggering time computed in the preceding step E20;

TP is the weight-computing time obtained by the processor means 30 from the above-described table, as a function of the format of the mail item, namely TP2 for a mail item of format F2;

TC is the computing time necessary for the processor means 30 to compute the enciphered code required by international standards, said time being an incompressible time of about 500 ms;

TM is the known and constant communication management time for managing communication of messages between the weigh module and the franking module, via the computer link 16B; and TA is the constant time necessary for a mail item to reach the print head of the franking module from the time at which the mail item enters the franking module.

In a preferred embodiment, the speed of advance of the conveyor means of the weigh module 12 can advantageously be kept lower than the constant speed of the second conveyor means of the franking module.

This characteristic facilitates transferring the mail item from the weigh module 12 to the franking module 14, in particular by preventing the mail item from "nose-diving".

Thus, the processor means 30 constitute means for regulating the speed V of the conveyor means, said speed of advance taking account of the weighing time TP2.

In the preferred embodiment described above, the means 30 for regulating the speed V take account of the computing time TC required for computing the enciphered code.

This particularly advantageous characteristic makes it possible to guarantee that transferring the mail item to the franking module 14 takes place after said computation.

When the processor means 30 are sufficiently rapid, the enciphering time TC becomes negligible relative to the weighing time TP, and is not taken into account explicitly in computing the speed V, which is thus obtained using the following formula:

$$V=(L-\Delta L+AP-LG(N))/(TD+TP+TC+TM-TA)$$

In any event, after the step E30 for computing the speed of advance of the conveyor means, the processor means 30 control the conveyor means, namely the conveyor belt 22, in order to impart said speed of advance V to it.

Advance of the mail items on the conveyor means of the weigh module is thus optimized while guaranteeing that the mail item is weighed accurately.

This invention makes it possible to handle mail items in arbitrarily mixed batches and on the fly, without jamming occurring at the weigh module or at the franking module, and without it being necessary to stop the advance of the conveyor means of the weigh module.

The mail items are then transferred in known manner to the franking module 14.

In the handling system of the invention, the franking module includes second conveyor means that are independent from the conveyor means of the weigh module.

Said second conveyor means are adapted to move the mail item at a predetermined constant speed, under an ink jet print head in order to print the enciphered code obtained during step E30, as well as other information, if necessary.

In the embodiment described herein, the selector means are adapted to guarantee that the predetermined distance GAP is maintained between the leading edges of two consecutive mail items on the conveyor means of the weigh module.

For this purpose, the selector means extract a given mail item from the feed means at the time at which weighing of the preceding mail item N−1 is triggered, i.e. after the time TE counted as from extraction of said mail item N−1.

Thus, in this embodiment, the weigh module guarantees that while a mail item is being weighed, only said mail item is on the weigh tray at the time at which it is weighed.

In a preferred embodiment, when the constant time TA taken by the mail item to reach the print head from the inlet of the franking module is greater than the enciphering time TC, the weighing time is increased for the mail item by choosing a weighing time TP3 from the table TB that is greater than the time TP2 associated in the table TB with the format F2 of said mail item.

This lengthened weighing time TP' makes it possible to obtain weighing that is more reliable in that there is no need to take account of certain kinds of noise affecting the accuracy of weighing as generated, for example, by vibration of the handling system.

Figure 4:
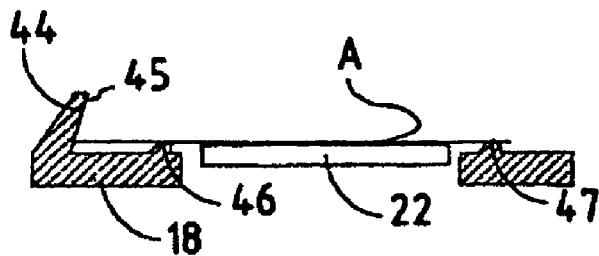
FIG. 4 is a diagrammatic cross-section view of a portion of the weigh module of the invention in a preferred embodiment.

FIG. 4 is a diagrammatic cross-section view of a portion of the weigh module 12.

In this particular embodiment, the side wall 44 of the weigh module 12 has a back-slope 45 sloping back towards the mail item A being transferred.

The back-slope 45 advantageously makes it possible to keep the mail item A flat on the conveyor belt 22 as said mail item slides along said wall 44.

In a preferred embodiment, at the weigh tray 18, the weigh module has two edges 46 and 47 that are raised slightly relative to the surface of the conveyor belt 22.

Thus, the mail item is propped up a little while it is being weighed, thereby limiting friction on the weigh tray 18, and guaranteeing that the mail item is driven by the conveyor means 22, at the appropriate speed V computed in step E30.

The amount of lifting is small enough not to distort the result of the weighing.

What is claimed is:

1. Apparatus for handling mail, in particular mail in arbitrarily mixed batches, said apparatus comprising:
    a feed module for feeding in mail items to be franked;
    a detector for detecting at least one dimension of said mail item;
    an evaluator for evaluating a weighing time taken to weigh said mail item as a function of said at least one dimension; and
    a regulator adapted to take account of said weighing time in order to regulate the speed of advance of a conveyor of a weigh module, said conveyor being adapted to drive said mail item towards a franking module;
    said weigh module further including:
    a selector adapted to obtain one mail item at a time, from said feed module;
    a weigh tray for weighing said mail item; and
    a computer for computing an enciphered code representing, in particular, the weight of said mail item; and
    said franking module including a printer adapted to print said enciphered code onto said mail item, and a second conveyor for conveying said mail item that is independent of the conveyor of said weigh module.

2. Apparatus according to claim 1, wherein:
    said regulator further takes account of the computing time taken for computing said enciphered code for regulating said speed of the conveyor of the weigh module, and guarantee that the transfer of said mail item to the franking module effected by said weigh module takes place after said computation.

3. Apparatus according to claim 1, wherein said selector is adapted to guarantee that a predetermined distance is maintained between the leading edges of two consecutive mail items on the conveyor of the weigh module, said distance preferably being equal to the length of the weigh module.

4. Apparatus according to claim 3, wherein said weigh module is adapted to weigh said mail item when only said mail item is situated on said weigh tray.

5. Apparatus according to claim 1, wherein the conveyor of the weigh module is adapted to cause said item to slide against a wall of said weigh module before it is transferred to said franking module.

6. Apparatus according to claim 5, wherein, as seen from said mail item, said wall presents a back-slope that tends to maintain said mail item flat on said conveyor of the weigh module.

7. Apparatus according to claim 1, wherein, at least on said weigh tray, and on either side of its conveyor, said weigh module has two edges that are raised slightly relative to the surface of said conveyor.

8. An apparatus comprising:
    a feeder which feeds in a mail item;
    a detector which detects at least one dimension of said mail item;
    an evaluator which evaluates a weighing time required to weigh said mail item as a function of said at least one dimension; and
    a regulator adapted to take account of said weighing time in order to regulate the speed of advance of a conveyor of a weigh module, said conveyor being adapted to drive said mail item towards a franking unit;
    wherein said franking unit comprises a printer adapted to print a code onto said mail item.

* * * * *